United States Patent [19]

Trang

[11] Patent Number: 5,630,054
[45] Date of Patent: May 13, 1997

[54] METHOD AND APPARATUS FOR STORING AND RETRIEVING ERROR CHECK INFORMATION

[75] Inventor: Duc Trang, San Jose, Calif.

[73] Assignee: MTI Technology Center, Sunnyvale, Calif.

[21] Appl. No.: 424,771

[22] Filed: Apr. 18, 1995

[51] Int. Cl.$^6$ .............................. G01R 31/28; G06F 11/00
[52] U.S. Cl. ................... 395/185.05; 395/185.07; 371/51.1
[58] Field of Search .................. 395/185.05, 185.06, 395/185.07; 371/51.1

[56] References Cited

U.S. PATENT DOCUMENTS

| | | | |
|---|---|---|---|
| 3,887,901 | 6/1975 | Moore | 371/51.1 |
| 4,450,561 | 5/1984 | Gotze | 371/37 |
| 4,667,326 | 5/1987 | Young | 371/40 |
| 5,134,619 | 7/1992 | Henson et al. | 371/40.1 |
| 5,191,584 | 3/1993 | Anderson | 371/51.1 |
| 5,195,100 | 3/1993 | Katz et al. | 371/66 |
| 5,212,785 | 5/1993 | Powers et al. | 395/575 |
| 5,214,778 | 5/1993 | Glider et al. | 395/575 |
| 5,233,618 | 8/1993 | Glider et al. | 371/68.1 |
| 5,285,451 | 2/1994 | Henson et al. | 371/11.1 |
| 5,361,347 | 11/1994 | Glider et al. | 395/575 |
| 5,404,454 | 4/1995 | Parks | 395/275 |
| 5,469,453 | 11/1995 | Glider | 371/68.1 |

*Primary Examiner*—Robert W. Beausoliel, Jr.
*Assistant Examiner*—Glenn Snyder
*Attorney, Agent, or Firm*—Townsend and Townsend and Crew LLP

[57] ABSTRACT

A method and apparatus by which the partial error check value for all preceding data in a sector is updated each time a new data item is written into a data buffer during a transfer from a host computer to a system storage device. The partial check value is written into the buffer location following the location containing the most recently buffered data item from the associated sector. Thus, after the entire sector has been transferred into the buffer, the final check value for that sector will be available in the buffer location following the location containing the last written data from the associated sector. Upon readback of a sector from the storage device, the sector size is longer by one data item since the appended check value is treated as the last data item of the sector. When the sector is read back from the storage device, the check value is again updated with the entry of each data item. When the access is complete, the stored check value is compared with the newly-calculated value to determine whether an error has occurred. The present invention offers improved performance by eliminating some hardware and software elements needed to calculate and store the check value for a sector.

28 Claims, 3 Drawing Sheets

METHOD AND APPARATUS FOR STORING AND RETRIEVING ERROR CHECK INFORMATION

BACKGROUND OF THE INVENTION

The present invention relates generally to the storage of data in a computer system whose elements are connected to the system by an interface bus. More particularly, the invention is directed to a method and apparatus for storing and retrieving error check information used in determining whether data stored in and retrieved from mass storage devices in the system contains errors.

In general, error checking in a computer system may use a complex calculation to generate a value based on transmitted data. A check value is generated for and appended to an entire sector of data transferred from the host to a storage device in the computer system. When this same sector of data is retrieved from the storage device to the host, a check value is generated for the data portion and is compared with the appended check value to determine whether an error occurred during the transfer. Some possible types of error checking schemes are a checksum, a cyclic redundancy checksum (CRC), or parity checking, each of which are known in the art. The term "checksum" will be used hereinafter to describe error check information generally. It should be understood that the present invention may be applied to any error checking scheme.

The interface bus enables a host computer (or multiple hosts) to communicate with different classes of peripheral devices without major modifications to the overall system. Thus, different disk drives, tape drives, printers or communication devices can be added to the computer system interconnected by a device bus. For example, the host may write data to and retrieve data from a disk drive array. The disk drive array typically includes a controller to interface between the device bus and the system bus. The controller is then coupled to other controllers in the overall system and a data buffer across a system bus. Therefore, assuming there are a plurality of disk drive arrays, there will be a corresponding plurality of device bus controllers to interface between the system bus and drive arrays.

Multiple device bus controllers and multiple host bus controllers share a common storage data buffer across a system bus, as mentioned above. The buffer holds data being transferred between the host computer and system storage devices, such as the disk drive array. Each time a device bus controller or a host bus controller accesses the buffer for a data transfer, it may transfer only a portion of a sector with the buffer. Due to a mismatch in transfer rates between the interface bus and the system bus, the device bus controller or host bus controller releases control of the system bus if its internal buffer can no longer accommodate more data. Therefore, in order to transfer an entire sector of data, a device bus controller or a host bus controller may perform multiple accesses to the system data buffer. If, as is often the case, the multiple bus controllers require simultaneous access to the data buffer to transfer data, the multiple accesses for any given device bus controller or host bus controller may be interleaved with those from other bus controllers.

When the accesses are interleaved, in order to calculate and append the checksum at the end of a sector after all accesses for a sector have been completed, the system must include code components that determine which bus controller is accessing the data buffer, whether the current access is at the beginning or in the middle of a sector, when the bus controller has completed its current access and whether the end of a sector has been reached. If the access is to the beginning of a sector, the storage subsystem control logic must use an initial seed checksum value to calculate a partial checksum for the first portion of the sector being transferred. If the access is to the middle of a sector, the control logic must retrieve the partial checksum from a storage device and use this partial checksum to calculate an updated checksum for all portions of the sector that have been transferred up to this point. If the end of a sector has not been reached, then the updated partial checksum must be stored again in the buffer for future updating. If the end of the sector has been reached, however, the final checksum is written in the buffer location following the location containing the last written data from the associated sector.

The error checking system described above requires additional hardware as well as the complex code. Multiple registers are required to support the multiple device bus controllers and multiple host bus controllers, for example, one memory register for each controller to temporarily store the partial checksum for future updating.

SUMMARY OF THE INVENTION

The present invention eliminates the need to include in the system all of the complex code and hardware described above to calculate and store the checksum for a sector of data. The present invention introduces a method and apparatus by which a dedicated memory is used to update in real time the partial checksum for all preceding data items in the sector each time a new data item is written into the data buffer. This partial checksum value is written into the buffer location following the location containing the most recently stored data item from the associated sector. Thus, after the entire sector has been transferred into the buffer, the final checksum value for that sector will be available in the buffer location following the location containing the last written data from the associated sector. The present invention offers improved performance by eliminating some hardware and software elements that calculate and store the checksum for a sector.

A dual-bank memory device is used as the data buffer. The locations in one data bank are logically interleaved with the locations in the other data bank in such a way that successive locations alternate between the two data banks. When the host computer transfers a sector of data to a mass storage device, data is first staged in the data buffer and the partial checksum is calculated for all data stored in the buffer up to that point as each data item from the sector is buffered. As a data item is buffered into a location in one of the two data banks, the continuously updated partial checksum value is stored into the next location in the other data bank. When the next data item is buffered, the roles of the two data banks interchange. Now, the data item is stored into the location in the data bank that is holding the current partial checksum value, while the current partial checksum value is simultaneously retrieved from this location, recalculated to include the most recently buffered data item, and stored in the next location in the other data bank. If the most recently buffered data item is the last data item the host bus controller can transfer to the data buffer for the current access, the host bus controller releases control of the system bus. The current partial checksum value for all buffered data is stored in the location immediately following the location containing the most recently buffered data item. When the host bus controller is again available to resume the transfer, the operation starts at the location in the data buffer that is holding the current partial checksum value calculated from the previous access. A partial checksum value continues to be retrieved from its location in one data bank, recalculated to include the new data item, and stored in the next location in the other data bank for every new data item stored into the data buffer until the current access is complete and the host bus controller releases control of the system bus. The process repeats when the host bus controller is ready again to resume the transfer. When the final portion of the sector has been transferred and stored in the data buffer, the final checksum value for the entire sector will then be available in the location immediately following the location containing the last data item of the sector automatically appended to the sector. The entire sector, along with the appended final checksum value, is ready to be transferred and stored in a selected mass storage device.

For transferring multiple contiguous sectors of data, the first data item of the new sector is stored in the data buffer at the first location following the location containing the final checksum value for the immediately previous sector. After the last sector has been transferred to the data buffer, all sectors will have been automatically assembled contiguously in the data buffer with the final checksum value at the end of each sector, and all sectors are ready for transfer to the selected mass storage device. The location for the first data item of each sector is first initialized by the control logic with the initial seed checksum value.

Upon readback of a sector of data from a mass storage device to the host computer, the present invention operates in a fashion similar to that outlined above. In this case, the sector size is longer by one data item to accommodate for the appended checksum value, and the appended checksum is treated as the last data item of the sector when it is buffered into the data buffer from the selected mass storage device. As data is stored from the mass storage device to the data buffer, a partial checksum value continues to be retrieved from its location in one data bank, recalculated to include the new data item, and stored in the next location in the other data bank for every new data item stored into the data buffer until the current access is completed and the device bus controller releases control of the system bus. The process repeats when the device bus controller is ready again to resume the transfer. After the last data item of the sector (the appended checksum value in this case) has been transferred to the data buffer, the final calculated checksum value (the syndrome value in this case since it also includes the appended checksum value for the sector) is stored in the data buffer location following the location containing the last data item (the appended checksum value in this case). The sector data is then transferred from the data buffer to the host computer through the host bus controller. As the host bus controller, the appended checksum value and the syndrome value are truncated from the sector. The host bus controller examines the syndrome value to determine if the sector of data just transferred is free of checksum error. The host bus controller then reports the status of the transfer to the host computer and the storage subsystem control logic. If there is a checksum error, the control logic then initiates error recovery.

Readback of multiple contiguous sectors of data operates in the same way as readback of a single sector. In this case, the new sector of data is transferred to the data buffer beginning at the first location after the location containing the syndrome value for the immediately previous sector. The location for the first data item of each new sector is first initialized by the control logic with the initial seed checksum value. After the last sector and its appended checksum value have been transferred to the data buffer, the requested sectors of data are then transferred from the data buffer to the host computer through the host bus controller. At the host bus controller, the appended checksum value and the syndrome value are truncated from each of the sectors. The host bus controller examines the syndrome value for each sector to determine if the associated sector of data just transferred is free of checksum error. After the last sector has been transferred to the host computer and its syndrome value checked, the host bus controller then reports the status of the transfer to the host computer and the subsystem control logic. If there is a checksum error, the control logic then initiates error recovery.

The invention will be better understood by reference to the following detailed description in connection with the accompanying drawings.

DESCRIPTION OF THE PREFERRED EMBODIMENT

Figure 1:
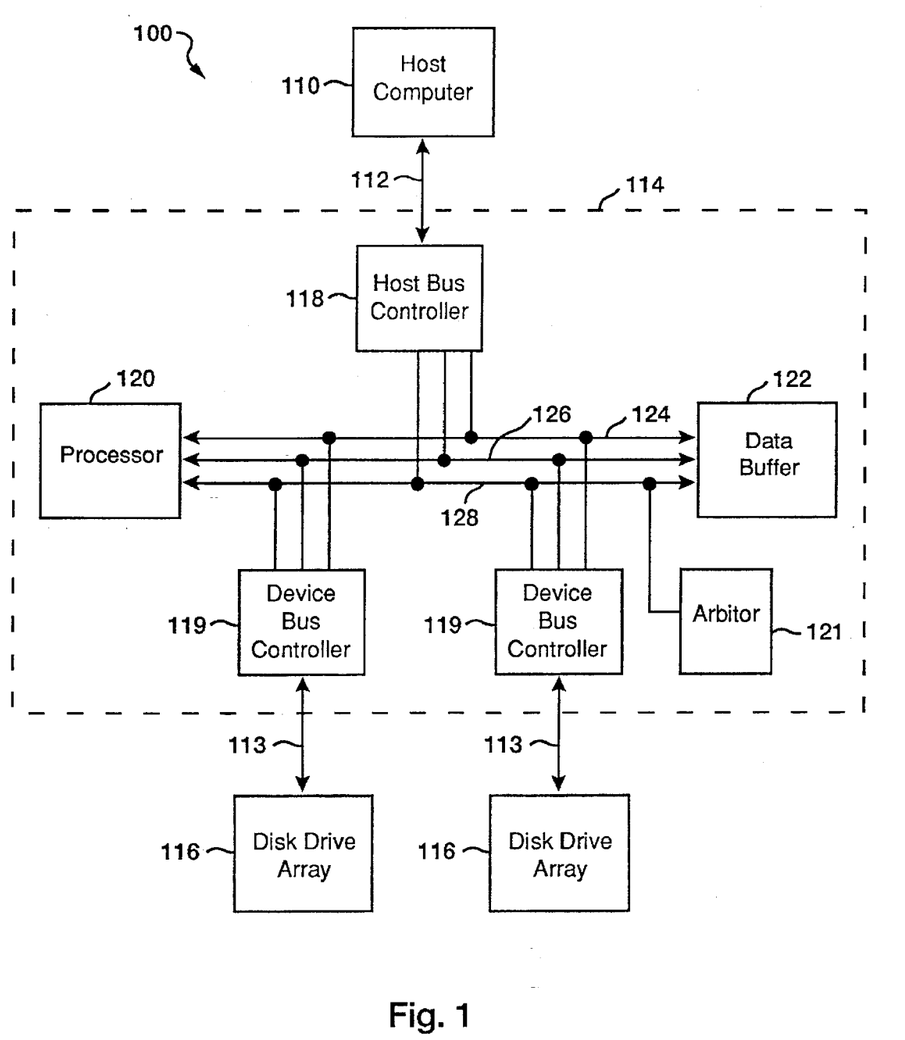
FIG. 1 shows a block diagram of a computer system implementing the method and apparatus of the present invention.

FIG. 1 shows a block diagram of a computer system 100 implementing the method and apparatus of the present invention. A host computer 110 is coupled by a host bus 112 to a storage subsystem 114. System peripherals, such as disk drive arrays 116, are coupled to subsystem 114 by device buses 113. Other peripherals in the system not shown in the figure could include, for example, a printer, tape system, optical disk array or data communications terminal. Operation of the present invention will be described in relation to a disk array, but it should be understood that the data buffer may also be used in conjunction with other system mass storage devices. Subsystem 114 includes host bus controllers 118 that connect the host buses 112 to the subsystem components, device bus controllers 119 that connect the device busses 113 to the subsystem components, arbiter 121 that decides which subsystem component will be the next component to gain control of subsystem bus for data transfer, a subsystem control logic 120, which may be, for example, a microprocessor, that controls operation of storage subsystem 114 and a disk data buffer 122 that stores data as it is being transferred between the host computer 110 and disk drives 116. The components of subsystem 114 are coupled by a bidirectional data bus 124, address bus 126 and control bus 128. Host bus controller 118 and device bus controller 119 are both capable of performing scatter/gather type operations so as to support the transfer of multiple contiguous sectors of data.

In operation, host computer 110 reads data from and writes data to the disk drive arrays 116 through subsystem 114, host buses 112, and device buses 113. Data transfers may require multiple accesses to store or retrieve an entire sector of data on a disk drive, since subsystem data bus 124 is faster than the host bus 112 and the device bus 113. Because multiple controllers 118 and 119 share access to data buffer 122, it may often be the case that the controllers 118 and 119 require simultaneous access to data buffer 122 for a data transfer. The multiple accesses for any given bus controller 118 or 119 will therefore be interleaved with those from other controllers 118 and 119. The data buffer 122 of the present invention enables a partial checksum value to be calculated and stored in the buffer along with interleaved sector data as it is buffered.

Figure 2:
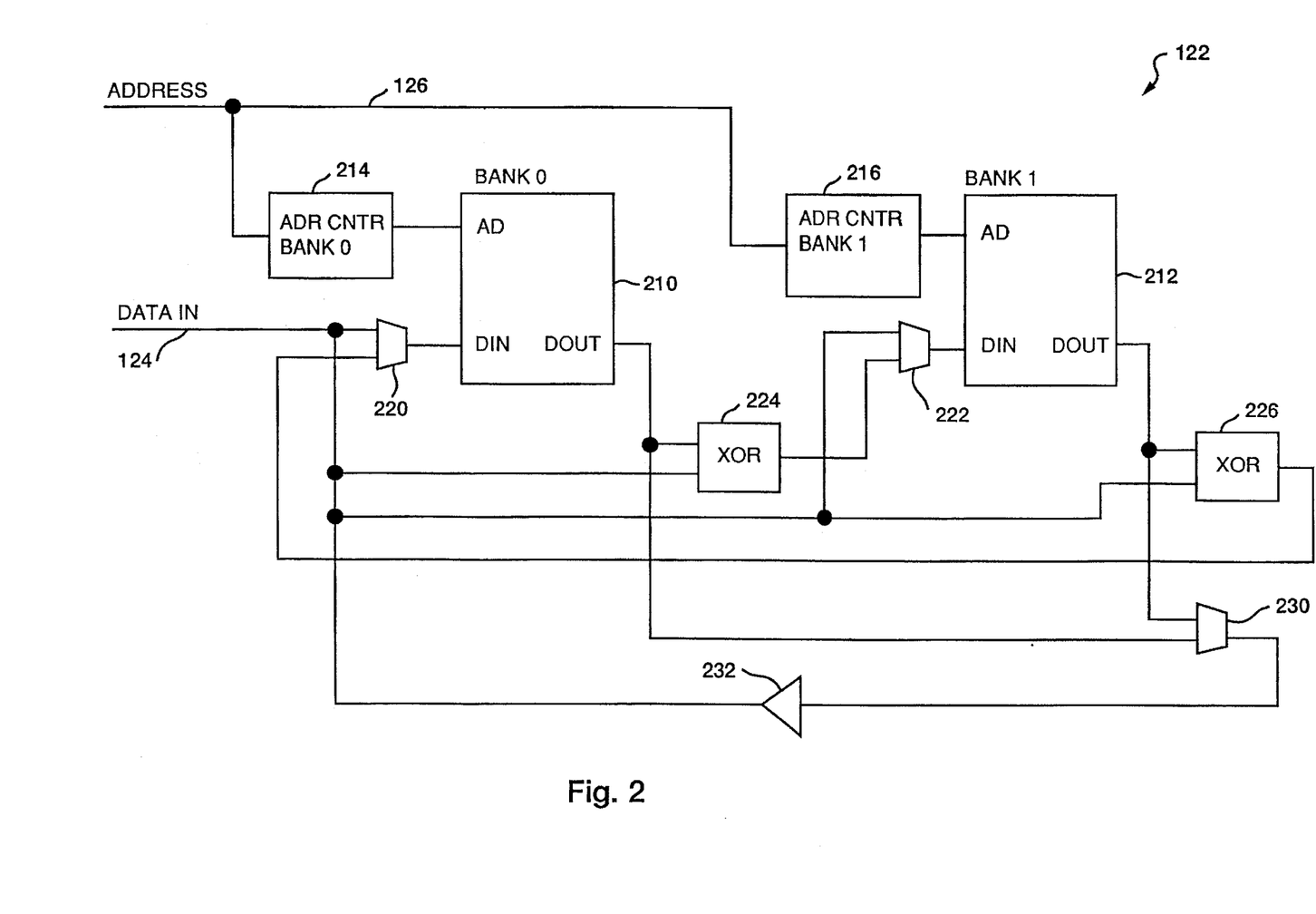
FIG. 2 shows a block diagram of the data buffer of the present invention.

FIG. 2 shows a block diagram of the data buffer 122 of the present invention from FIG. 1. The data buffer includes a dual-bank memory structure with memory devices 210 and 212, which may be based on either static or dynamic random-access memories. The width of a location in each memory device is the same as the width of the subsystem data bus 124. Memory device 210 is coupled to address counter 214, while memory device 212 is coupled to address counter 216. Both address counters 214 and 216 are coupled to subsystem address bus 126 from FIG. 1, which carries address information to the buffer 122. The data input terminal for each memory device 210 and 212 is coupled to the output of a multiplexer 220 and 222, respectively. The data output terminal for each memory device 210 and 212 serves as an input to logic functions 224 and 226, respectively. The other input to each logic function is subsystem data bus 124 (shown in FIG. 1). Logic function blocks 224 and 226 should perform the function of updating checksum values and may be implemented by, for example, exclusive-or (XOR) functions. Subsystem data bus 124 also serves as an input to each multiplexer 220 and 222. The other input to mux 220 is the output of logic function 226, while the second input to mux 222 is the output of logic function 224. The data output terminals of both memory banks 210 and 212 also serve as the inputs to multiplexer 230, whose output is coupled by tristate buffer 232 to subsystem data bus 124. The multiplexers and tristate buffer are controlled by control logic residing in the storage subsystem 114.

In operation, control logic 120, after being informed by host computer 110 that the host needs to transfer a sector of data to a disk drive 116, allocates a section of data buffer 122 to store write data from the host.

In one embodiment, the first address location of the allocated section coincides with the first address location in data buffer 122. Also, memory device 210 contains even address locations (even data bank) and memory device 212 odd address locations (odd data bank) so that the first address location in data buffer 122 coincides with the first address location in memory device 210. The first address location of the allocated section therefore is the first address location in memory device 210, the second address location of the allocated section is the first address location in memory device 212, the third address location of the allocated section is the second address location in memory device 210, the fourth address location of the allocated section is the second address location in memory device 212, and so on.

Control logic 120 then stores the initial seed checksum value in the first address location of the allocated section. Since this is also the first address location in memory device 210, the first address location in memory device 210 contains the initial seed checksum value. Control logic 120 next sends the initial address information in the data buffer to the host bus controller 118 that interfaces with host computer 110 and then informs host bus controller 118 that it may begin the data transfer. Host bus controller 118 then arbitrates for the use of subsystem data bus 124, it begins the data transfer by placing the initial address value on subsystem address bus 126, which is then used to initialize address counters 214 and 216. Address counter 214 now points to the first address location in memory device 210, and address counter 216 to the first address location in memory device 212. Host bus controller 118 then places the first data word of the sector on subsystem data bus 124 for transfer to data buffer 122. This first data word is to be stored in the first address location of the allocated section, which is the first address location in memory device 210. The current content of the first address location in memory device 210 is the initial seed checksum value, and is read and placed at one input terminal of logic function 224. At the same time, the first data word on subsystem data bus 124 is placed at the other input terminal of logic function 224 and the input terminal of memory device 210 through multiplexer 220. The output terminal of logic function 224 of the initial seed checksum value and the first data word is the new first partial checksum value for the sector data transferred up to and including the first data word. The new first partial checksum value is placed at the input terminal of memory device 212 through multiplexer 222. The first data word is then stored at the first address location in memory device 210 writing over the initial seed checksum value originally stored here, and the new first partial checksum value is stored at the first address location in memory device 212. Address counter 214 is then incremented to point to the second address location in memory device 210 while address counter 216 is not so that address counter 216 still points to the first address location in memory device 212.

Each memory device 210 and 212 has a separate input path and output path, which allows data to be input to the memory device while read data is available at the output terminal. Each memory device also has the capability to hold the contents of one location for readout before writing new data to that location. This feature allows the hardware to read the current partial checksum value from one location, place it at the output terminal, perform the logic function with the new data on subsystem data bus 124, and write the new data word to the same location. Also, once address counters 214 and 216 have been initialized with the first address to be accessed in the present operation, each one will be incremented to the next address location following a write of data, but not an updated checksum value, to its associated memory device. An address counter is not updated after writing an updated checksum value because the counter must still point to the checksum in order to read it out of the associated memory device and input it to the appropriate logic function with an incoming data word.

When host bus controller 118 places the second data word of the sector on subsystem data bus 124, this second data word is to be stored in the second address location of the allocated section which is the first address location in memory device 212. The current content of the first address location in memory device 212, the first partial checksum value, is read and placed at one input terminal of logic function 226. At the same time, the second data word on subsystem data bus 124 is placed at the other input terminal of logic function 226 and the input terminal of memory device 212 through multiplexer 222. The output of logic function 226 of the first partial checksum value and the second data word is the new second partial checksum value for the sector data transferred up to and including the second data word. The new second partial checksum value is placed at the input terminal of memory device 210 through multiplexer 220. The second data word is then stored at the first address location in memory device 212 writing over the first partial checksum value originally stored here, and the new second partial checksum value is stored at the second address location in memory device 210 as pointed to by address counter 214. Address counter 216 is then incremented to point to the second address location in memory device 212 while address counter 214 is not incremented.

Consequently, address counter 214 still points to the second address location in memory device 210.

This process is repeated as each data word in the sector is input from host computer 110 on subsystem data bus 124 to be stored in data buffer 122. The data words are stored in successive memory locations alternating between memory devices 210 and 212. After the final data word from the sector has been stored in data buffer 122, the buffer location immediately after the final data word in the other memory device will contain the final checksum value for the entire sector. The sector of data and the appended final checksum value are then ready to be transferred to the selected disk drive 116. The data is read out from successive locations alternating between memory devices 210 and 212, through tristate buffer 232 onto subsystem data bus 124 to the associated device bus controller 119.

The above example assumes that the first address location in data buffer 122 of the allocated section is an even value resulting in the first address location of the allocated section being in memory device 210. In the event that control logic 120 allocates a section that starts with an odd first address location in data buffer 122, resulting the first address location being in memory device 212, the process operates in the same way except that address counters 214 and 216 are initialized to different values: address counter 216 to the initial address value, address counter 214 to the initial address value plus one location. This is necessary to prevent the access for the second data word from going backward to the preceding address.

For writing of multiple contiguous sectors, control logic 120 partitions the allocated section in data buffer 122 into contiguous blocks of equal size. The number of blocks is equal to that of sectors being transferred, and the size of the block is equal to the sector size plus one location for storing the sector data and appending the final checksum value. Control logic 120 next stores the initial seed checksum value in the first address location of each block. Control logic 120 proceeds by sending the initial address information in the data buffer of the first sector to the host bus controller 118 and informing it that it may begin the data transfer. The initial address in the data buffer of the first sector is the first address location in the data buffer of the first block. Host bus controller 118 performs the data transfer as described above until the last data word of the first sector is transferred to data buffer 122, at which time the final checksum value for the entire first sector is stored in the location immediately after the last data word. Using scatter type operation, host bus controller 118 carries out the transfer of the second sector to the data buffer beginning at the second location after the location containing the last data word of the immediately previous sector. The first location after the location containing the last data word of the immediately previous sector contains the final checksum value for that sector. The first address location in the data buffer of the second sector therefore is the first address location in the data buffer of the second block. The scatter type transfer continues until the last sector has been transferred to the data buffer. When the process ends, the sectors, each with the final checksum value appended to it, are contiguous in data buffer 122. The data is then read out from successive locations alternating between memory devices 210 and 212, through tristate buffer 232 onto subsystem data bus 124 to deice bus controller 119 to be stored in the selected disk drive 116.

In readback, upon receiving a request from host computer 110 to read a sector of data, control logic 120 allocates a section of data buffer 122 to store read data from the mass storage device, then stores the initial seed checksum value in the first address location of the allocated section in the same way as for receiving write data from the host detailed above. Control logic 120 next sends the initial address information in the data buffer to the device bus controller 119 that interfaces with the selected disk drive 116 and then informs device bus controller 119 that it may begin the data transfer. When read data is available from the selected disk drive 116, device bus controller 119 arbitrates for the use of subsystem data bus 124 for the data transfer. When the device bus controller 119 gains control of subsystem data bus 124, it begins the data transfer by placing the initial address value on subsystem address bus 126, which is then used to initialize address counters 214 and 216 in the same way as for receiving write data from the host detailed above. Device bus controller 119 then places read data of the sector on subsystem data bus 124 for transfer to data buffer 122. The process of storing read data words in successive address locations alternating between memory devices 210 and 212, and retrieving, updating, and storing the partial checksum value operates in the same way as write operation detailed above. The process continues until the appended checksum value for the requested sector has been transferred in data buffer 122. At this point, the address location in data buffer 122 immediately after the location containing the appended checksum value is the final calculated checksum value for all data in the sector and the appended checksum value. This final calculated checksum value is actually the syndrome value for the sector because it also includes the appended checksum value. The requested sector of data is ready to be transferred to host computer 110 when host computer 110 is available. The data is read out from successive locations alternating between memory devices 210 and 212, through tristate buffer 232 onto subsystem data bus 124 to the associated host bus controller 118. Host bus controller 118 truncates the appended checksum value, the syndrome value from the sector, and examines the syndrome value to determine if there has been a checksum error. Host bus controller 118 then reports the status of the transfer to host computer 110 and control logic 120. If there has been a checksum error, control logic 120 initiates error recovery.

For reading of multiple contiguous sectors of data, control logic 120 logically partitions the allocated section in data buffer 122 into contiguous blocks of equal size. The number of blocks is equal to that of sectors being transferred, and the size of the block is equal to the sector size plus two locations for storing the sector data, the appended checksum value, and the syndrome value. Control logic 120 next stores the initial seed checksum value in the first address location of each block. Control logic 120 then initiates the reading of the first sector. The process operates in the same way as reading a single sector of data. After all data of a sector and its appended checksum value have been transferred to data buffer 122, device bus controller 119 uses the scatter type transfer to read the next sector to data buffer 122 beginning at the first location after the location containing the syndrome value of the immediately previous sector. The process continues until the last sector and its appended checksum value have been transferred into data buffer 122. The requested sectors of data are ready to be transferred to host computer 110 when host computer 110 is available. Host bus controller 118 truncates the appended checksum value, the syndrome value from each sector, and examines the syndrome values to determine if there has been a checksum error. Host bus controller 118 then reports the status of the transfer to host computer 110 and control logic 120. If there has been a checksum error, control logic 120 initiates error recovery.

Figure 3A:
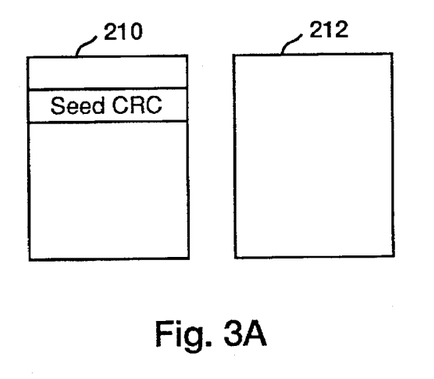
FIGS. 3A–3D show the data buffer in successive stages as data and an updated checksum value are stored according to the present invention.
Figure 3B:
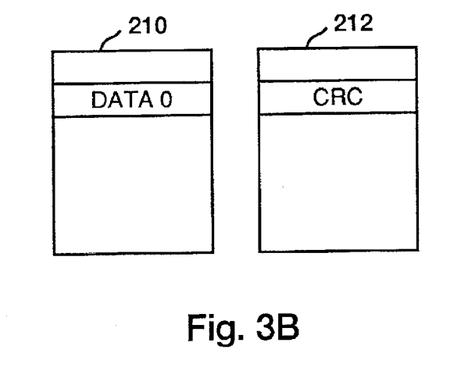
Figure 3C:
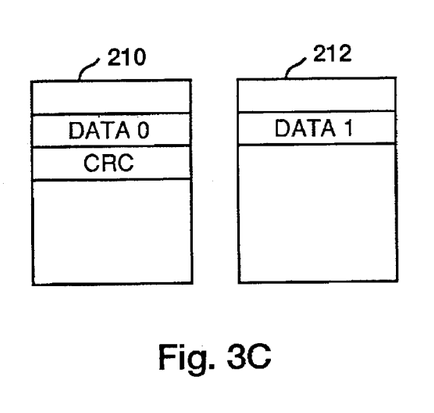
Figure 3D:
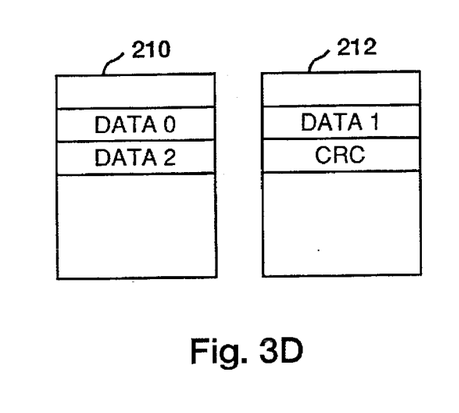

FIGS. 3A–3D show an example of the successive steps of storing data and an updated checksum in memory devices 210 and 212. These steps are described above in detail in conjunction with FIG. 2. FIG. 3A shows the initial condition of both memory devices 210 and 212 in data buffer 122 before a sector of data is transferred to the data buffer. An initial seed checksum value has been stored in a first address location in memory device 210, while memory device 212 is still empty. In FIG. 3B, the first data word DATA 0 from the sector has been stored in the same location in memory device 210 that had previously held the seed checksum value. Additionally, the seed checksum value and first data word DATA 0 have been input to the logic function 224 (as described above) to calculate a new updated checksum, which is then stored in a first address location in memory device 212. In FIG. 3C, the second data word DATA 1 from the sector has been stored in the same location in memory device 212 that had previously held the updated checksum value. Also, the old checksum value from memory device 212 and second data word DATA 1 have been input to logic function 226 (as described above) to provide a new updated checksum. The newly-updated checksum value is then stored in the address location in memory device 210 that follows first data word DATA 0, which has remained in the location where it was initially stored. In FIG. 3D, the third data word DATA 2 from the sector has been stored in the same location in memory device 210 that had previously held the updated checksum value. Also, the old checksum value from memory device 210 and third data word DATA 2 have been input to logic function 224 (as described above) to provide a new updated checksum. The newly-updated checksum value is then stored in the address location in memory device 212 that follows second data word DATA 1, which has remained in the location where it was initially stored. This process is repeated until the entire sector of data has been transferred into memory devices 210 and 212 and a final checksum value for the entire sector has been calculated and stored with the data.

The invention has now been explained with reference to specific embodiments. Other embodiments will be apparent to those of ordinary skill in the art upon reference to the present description. It is therefore not intended that this invention be limited, except as indicated by the appended claims.

What is claimed is:

1. In a computer system having a host computer, a storage subsystem and a plurality of storage devices, wherein the storage subsystem includes a control logic, a data buffer and a plurality of bus controllers, a method for calculating and storing a check value associated with a transfer of a block of data from the host computer to the data buffer, the method comprising the steps of:

a) providing a first memory device and a second memory device in the data buffer;
   b) performing a logic function on a first data word and an initial seed check value to produce an updated partial check value;
   c) storing the first data word in a first location in the first memory device;
   d) storing the updated partial check value in a first location in the second memory device;
   e) performing the logic function on a second data word and the updated partial check value to produce a second updated partial check value;
   f) storing the second data word in the first location in the second memory device; and
   g) storing the second updated partial check value in a second location in the first memory device.

2. The method of claim 1 further comprising the step of repeating steps (b) through (g) for subsequent data words using subsequent locations in the first and second memory devices until all data words in the block of data have been stored in the data buffer.

3. The method of claim 1 further comprising the steps of:
   selecting the first location in the second memory device to immediately follow the first location in the first memory device; and
   selecting the second location in the first memory device to immediately follow the first location in the second memory device.

4. The method of claim 1 further including the step of storing the initial seed check value in the first location in the first memory device.

5. The method of claim 1 wherein the step of providing a first memory device and a second memory device further includes providing in each memory device a separate input path, a separate output path and a means for holding existing data from a location before replacing the existing data with new data from the data bus.

6. The method of claim 1 wherein the step of performing a logic function further comprises the step of performing an exclusive-or function.

7. In a computer system having a host computer, a storage subsystem and a plurality of storage devices, wherein the storage subsystem includes a control logic, a data buffer and a plurality of bus controllers, a method for calculating and storing a check value associated with a transfer of a block of data from one of the plurality of storage devices to the data buffer, the method comprising the steps of:

a) providing a first memory device and a second memory device in the data buffer;
   b) performing a logic function on a first data word and an initial seed check value to produce an updated partial check value;
   c) storing the first data word in a first location in the first memory device;
   d) storing the updated partial check value in a first location in the second memory device;
   e) performing the logic function on a second data word and the updated partial check value to produce a second updated partial check value;
   f) storing the second data word in the first location in the second memory device; and
   g) storing the second updated partial check value in a second location in the first memory device.

8. The method of claim 7 further comprising the steps of:
   repeating steps (b) through (g) for subsequent data words using subsequent locations in the first and second memory devices until all data words in the block of data have been stored in the data buffer and a final calculated check value has been produced; and
   performing the logic function on a stored check value in the block of data and the final calculated check value to produce a syndrome check value.

9. The method of claim 7 further comprising the steps of:
   selecting the first location in the second memory device to immediately follow the first location in the first memory device; and
   selecting the second location in the first memory device to immediately follow the first location in the second memory device.

10. The method of claim 7 further including the step of storing the initial seed check value in the first location in the first memory device.

11. The method of claim 7 wherein the step of providing a first memory device and a second memory device further includes providing in each memory device a separate input path, a separate output path and a means for holding existing data from a location before replacing the existing data with new data from the data bus.

12. The method of claim 7 wherein the step of performing a logic function further comprises the step of performing an exclusive-or function.

13. In a computer system having a host computer, a storage subsystem and a plurality of storage devices, wherein the storage subsystem includes a control logic, a data buffer and a plurality of bus controllers, and wherein data is transferred between the host computer and the plurality of storage devices through the storage subsystem, the data buffer comprising:

a data bus;

a first memory device having a data input terminal, an address input terminal and a data output terminal, the data input terminal of the first memory device coupled to the data bus;

a second memory device having a data input terminal, an address input terminal and a data output terminal, the data input terminal of the second memory device coupled to the data bus;

a first logic function having a first input terminal coupled to the data output terminal of the first memory device, a second input terminal coupled to the data bus and an output terminal coupled to the second memory device;

a second logic function having a first input terminal coupled to the data output terminal of the second memory device, a second input terminal coupled to the data bus and an output terminal coupled to the first memory device; and a control circuit for alternately selecting between the first memory device and the second memory device wherein the control circuit selects the first memory device to cause the first memory device to receive a first new data word from the data bus and to output a first existing check value to the first logic function, the first existing check value and the first new data word being input to the first logic function to calculate a first updated partial check value which is stored in the second memory device, and the control circuit selects the second memory device to cause the second memory device to receive a second new data word from the data bus and to output a second existing check value to the second logic function, the second existing check value and the second new data word being input to the second logic function to calculate a second updated partial check value which is stored in the first memory device.

14. The system of claim 13 further comprising:

a first address counter having an input terminal and an output terminal coupled to the address input terminal of the first memory device;

a second address counter having an input terminal and an output terminal coupled to the address input terminal of the second memory device;

an address bus coupled to the input terminals of the first and second address counters;

a first multiplexer having a first data input terminal coupled to the data bus, a second data input terminal coupled to the data output terminal of the second logic function, and a data output terminal coupled to the data input terminal of the first memory device;

a second multiplexer having a first data input terminal coupled to the data bus, a second data input terminal coupled to the data output terminal of the first logic function, and a data output terminal coupled to the data input terminal of the second memory device;

a third multiplexer having a first data input terminal coupled to the data output terminal of the first memory device, a second data input terminal coupled to the data output terminal of the second memory device, and a data output terminal; and a tristate buffer having an input terminal coupled to the data output terminal of the third multiplexer and an output terminal coupled to the data bus.

15. The computer system of claim 13 wherein each of the first and second memory devices further includes a separate input path, a separate output path and a means for holding existing data from a location before replacing the existing data with new data from the data bus.

16. The computer system of claim 13 wherein the host computer, storage subsystem and the plurality of storage devices are interconnected by a Small Computer Systems Interface (SCSI) bus.

17. The computer system of claim 13 wherein one of the plurality of storage devices comprises at least one disk drive.

18. The computer system of claim 13 wherein an initial seed check value is stored in the first location in the first memory device.

19. The computer system of claim 13 wherein the first logic function and the second logic function each comprises an exclusive-or function.

20. A data buffer comprising:

a data bus;

a first memory device having a data input terminal, an address input terminal and a data output terminal, the data input terminal of the first memory device coupled to the data bus;

a second memory device having a data input terminal, an address input terminal and a data output terminal, the data input terminal of the second memory device coupled to the data bus;

a first logic function having a first input terminal coupled to the data output terminal of the first memory device, a second input terminal coupled to the data bus and an output terminal coupled to the second memory device;

a second logic function having a first input terminal coupled to the data output terminal of the second memory device, a second input terminal coupled to the data bus and an output terminal coupled to the first memory device; and a control circuit for alternately selecting between the first memory device and the second memory device, wherein the control circuit selects the first memory device to cause the first memory device to receive a first new data word from the data bus and to output a first existing check value to the first logic function, the first existing check value and the first new data word being input to the first logic function to calculate a first updated partial check value which is stored in the second memory device, and the control circuit selects the second memory device to cause the second memory device to receive a second new data word from the data bus and to output a second existing check value to the second logic function, the second existing check value and the second new data word being input to the second logic function to calculate a second updated partial check value which is stored in the first memory device.

21. The data buffer of claim 20 further comprising:

a first address counter having an input terminal and an output terminal coupled to the address input terminal of the first memory device;

a second address counter having an input terminal and an output terminal coupled to the address input terminal of the second memory device;

an address bus coupled to the input terminals of the first and second address counters;

a first multiplexer having a first data input terminal coupled to the data bus, a second data input terminal coupled to the data output terminal of the second logic function, and a data output terminal coupled to the data input terminal of the first memory device;

a second multiplexer having a first data input terminal coupled to the data bus, a second data input terminal coupled to the data output terminal of the first logic function, and a data output terminal coupled to the data input terminal of the second memory device;

a third multiplexer having a first data input terminal coupled to the data output terminal of the first memory device, a second data input terminal coupled to the data output terminal of the second memory device, and a data output terminal; and a tristate buffer having an input terminal coupled to the data output terminal of the third multiplexer and an output terminal coupled to the data bus.

22. The data buffer of claim 19 wherein each of the first and second memory devices further includes a separate input path, a separate output path and a means for holding existing data from a location before replacing the existing data with new data.

23. The data buffer of claim 19 wherein an initial seed check value is stored in the first location in the first memory device.

24. The computer system of claim 19 wherein the first logic function and the second logic function each comprises an exclusive-or function.

25. In a computer system having a host computer, a storage subsystem and a plurality of storage devices, wherein the storage subsystem includes a control logic, a data buffer and a plurality of bus controllers, and wherein data is transferred between the host computer and the plurality of storage devices through the storage subsystem, the data buffer comprising:

a data bus;

a first memory device having a data input terminal coupled to the data bus, an address input terminal and a data output terminal;

a second memory device having a data input terminal coupled to the data bus, an address input terminal and a data output terminal;

a first logic function having a first input terminal coupled to the data output terminal of the first memory device, a second input terminal coupled to the data bus and an output terminal coupled to the second memory device;

a second logic function having a first input terminal coupled to the data output terminal of the second memory device, a second input terminal coupled to the data bus and an output terminal coupled to the first memory device;

a control circuit for alternately selecting between the first memory device and the second memory device;

a first address counter having an input terminal and an output terminal coupled to the address input terminal of the first memory device;

a second address counter having an input terminal and an output terminal coupled to the address input terminal of the second memory device;

an address bus coupled to the input terminals of the first and second address counters;

a first multiplexer having a first data input terminal, a second data input terminal coupled to the data output terminal of the second logic function, and a data output terminal coupled to the data input terminal of the first memory device;

a second multiplexer having a first data input terminal, a second data input terminal coupled to the data output terminal of the first logic function, and a data output terminal coupled to the data input terminal of the second memory device;

a data bus coupled to the first data input terminal of the first multiplexer and the first data input terminal of the second multiplexer;

a third multiplexer having a first data input terminal coupled to the data output terminal of the first memory device, a second data input terminal coupled to the data output terminal of the second memory device, and a data output terminal; and a tristate buffer having an input terminal coupled to the data output terminal of the third multiplexer and an output terminal coupled to the data bus.

26. A data buffer comprising:

a data bus;

a first memory device having a data input terminal coupled to the data bus, an address input terminal and a data output terminal;

a second memory device having a data input terminal coupled to the data bus, an address input terminal and a data output terminal;

a first logic function having a first input terminal coupled to the data output terminal of the first memory device, a second input terminal coupled to the data bus and an output terminal coupled to the second memory device;

a second logic function having a first input terminal coupled to the data output terminal of the second memory device, a second input terminal coupled to the data bus and an output terminal coupled to the first memory device;

a control circuit for alternately selecting between the first memory device and the second memory device;

a first address counter having an input terminal and an output terminal coupled to the address input terminal of the first memory device;

a second address counter having an input terminal and an output terminal coupled to the address input terminal of the second memory device;

an address bus coupled to the input terminals of the first and second address counters;

a first multiplexer having a first data input terminal, a second data input terminal coupled to the data output terminal of the second logic function, and a data output terminal coupled to the data input terminal of the first memory device;

a second multiplexer having a first data input terminal, a second data input terminal coupled to the data output terminal of the first logic function, and a data output terminal coupled to the data input terminal of the second memory device;

a data bus coupled to the first data input terminal of the first multiplexer and the first data input terminal of the second multiplexer;

a third multiplexer having a first data input terminal coupled to the data output terminal of the first memory device, a second data input terminal coupled to the data output terminal of the second memory device, and a data output terminal; and a tristate buffer having an input terminal coupled to the data output terminal of the third multiplexer and an output terminal coupled to the data bus.

27. In a computer system having a host computer, a storage subsystem and a plurality of storage devices, wherein the storage subsystem includes a control logic, a data buffer and a plurality of bus controllers, and wherein data is transferred between the host computer and the plurality of storage devices through the storage subsystem, the data buffer comprising:

a first memory device having a data input terminal, an address input terminal and a data output terminal;

a second memory device having a data input terminal coupled to the data bus, an address input terminal and a data output terminal;

a first logic function having a first input terminal coupled to the data output terminal of the first memory device, a second input terminal coupled to the data bus and an output terminal coupled to the second memory device;

a second logic function having a first input terminal coupled to the data output terminal of the second memory device, a second input terminal coupled to the data bus and an output terminal coupled to the first memory device;

a control circuit for alternately selecting between the first memory device and the second memory device;

means for inputting an existing check value from the first memory device and a new data word from the data bus to the first logic function to calculate an updated partial check value to be stored in the second memory device; and means for inputting an existing check value from the second memory device and a new data word from the data bus to the second logic function to calculate an updated partial check value to be stored in the first memory device.

28. A data buffer comprising:

a data bus;

a first memory device having a data input terminal coupled to the data bus, an address input terminal and a data output terminal;

a second memory device having a data input terminal coupled to the data bus, an address input terminal and a data output terminal;

a first logic function having a first input terminal coupled to the data output terminal of the first memory device, a second input terminal coupled to the data bus and an output terminal coupled to the second memory device;

a second logic function having a first input terminal coupled to the data output terminal of the second memory device, a second input terminal coupled to the data bus and an output terminal coupled to the first memory device;

a control circuit for alternately selecting between the first memory device and the second memory device;

means for inputting an existing check value from the first memory device and a new data word from the data bus to the first logic function to calculate an updated partial check value to be stored in the second memory device; and means for inputting an existing check value from the second memory device and a new data word from the data bus to the second logic function to calculate an updated partial check value to be stored in the first memory device.

* * * * *